(12) United States Patent
Baron et al.

(10) Patent No.: US 6,983,766 B2
(45) Date of Patent: Jan. 10, 2006

(54) LINED PIPE WHEREIN THE LINER COMPRISES A ONE-WAY VALVE

(75) Inventors: John Joseph Baron, Calgary (CA);
Karol Edward Szklarz, Calgary (CA)

(73) Assignee: Shell Oil Company, Houston, TX (US)

( * ) Notice: Subject to any disclaimer, the term of this patent is extended or adjusted under 35 U.S.C. 154(b) by 71 days.

(21) Appl. No.: 10/451,344

(22) PCT Filed: Dec. 19, 2001

(86) PCT No.: PCT/EP01/15138

§ 371 (c)(1),
(2), (4) Date: Jun. 20, 2003

(87) PCT Pub. No.: WO02/50470

PCT Pub. Date: Jun. 27, 2002

(65) Prior Publication Data

US 2004/0025951 A1    Feb. 12, 2004

(30) Foreign Application Priority Data

Dec. 21, 2000   (EP)   ................................ 00311528

(51) Int. Cl.
*F16L 55/16*   (2006.01)
(52) U.S. Cl. ........................ 138/98; 138/104; 138/112; 138/114
(58) Field of Classification Search ............... 138/104, 138/98, 97, 112, 114; 137/540
See application file for complete search history.

(56) References Cited

U.S. PATENT DOCUMENTS

| 4,934,654 A | * | 6/1990 | Linnemann | 251/144 |
| 5,520,484 A | * | 5/1996 | Kamiyama et al. | 405/184.2 |
| 6,056,016 A | * | 5/2000 | Rogers | 138/98 |
| 6,634,387 B1 | * | 10/2003 | Glejbol | 138/104 |
| 2004/0074551 A1 | * | 4/2004 | McIntyre | 138/104 |

FOREIGN PATENT DOCUMENTS

| GB | 2115103 | * | 9/1983 |
| WO | WO 00/08368 | | 2/2000 |
| WO | WO 00/17479 | | 3/2000 |
| WO | WO 02/33298 | * | 4/2002 |
| WO | WO/0233298 | | 4/2002 |

OTHER PUBLICATIONS

International Search Report for Appln No.: PCT/EP01/15138 dated Oct. 21, 2002.

\* cited by examiner

*Primary Examiner*—James Hook
(74) *Attorney, Agent, or Firm*—William E. Hickman

(57) ABSTRACT

A pipe for the transport of fluids, which pipe is internally provided with a liner, wherein the liner is provided with at least one non-return valve arranged in the liner wall, wherein the non-return valve has an inlet end arranged near the outer surface of the liner wall and an outlet end arranged near the inner surface of the liner wall.

11 Claims, 1 Drawing Sheet

LINED PIPE WHEREIN THE LINER COMPRISES A ONE-WAY VALVE

PRIORITY CLAIM

The present application claims priority on European Patent Application 00311528.4 filed on 21 Dec. 2000.

1. Field of the Invention

The present invention relates to a pipe for transporting a fluid under pressure, which pipe is internally provided with a liner. More particular, the present invention relates to a liner for such a pipe, which liner is adapted such that it cannot be damaged by a pressure that is exerted by a fluid accumulated in an annulus between the liner and the pipe.

In the specification and in the claims the word pipe will be used to refer to any conduit for transporting a fluid, such as for example a pipeline.

2. Background of the Invention

In many industrial applications pipes are used to transport a fluid. Operating and environmental conditions usually require high mechanical strength of the pipe, and for this reason many pipes are made from metal such as carbon or low alloy steel. On the other hand, the pipe material is subject to corrosion and other detrimental influences than can be caused by the fluid in the interior of the pipe. Therefore, pipes are often provided with a corrosion-resistant internal liner.

The liner serves to prevent direct contact of fluid contained in the interior of the pipe with the inner surface of the pipe wall. To this end, the liner usually has the form of a hollow tube that conforms more or less to the inner surface of the pipe, and wherein the tube is made of a corrosion-resistant material, e.g. a polymer such as polyethylene or polyamide, a rubber, another synthetic material, or stainless steel. The space between the outer surface of the liner wall and the inner surface of the pipe wall in a certain region of the lined pipe will in the specification and in the claims be referred to as the intermediate space.

The size of the intermediate space, i.e. its shape and volume, is in part determined by the construction design of the lined pipe. For example, the liner may be fitted loosely or tightly into the surrounding pipe, and even with tight fitting liners it is possible that grooves or channels in the pipe wall and/or the liner wall constructively determine an intermediate space of a particular size. Further, in pipelines which are formed by attaching a plurality of lined pipes to each other, in the area of flanges between individual pipes an intermediate space may be present.

Further, the size of the intermediate space may change during operation of a lined pipe. Although commonly used synthetic liner materials are highly corrosion-resistant, they may be permeated by certain fluids or fluid components, for example hydrocarbon gas. Permeation can for example take place by molecular diffusion through the liner wall. The main driving force for diffusion is a difference of the partial pressures of fluid components that are able to permeate the liner wall material between the interior of the lined pipe and in the intermediate space. The speed of diffusion depends on the properties of the liner material, the fluid component, and other parameters such as temperature. As a result of the diffusion, or by another way of leakage, fluid may migrate to the intermediate space and accumulate therein thereby increasing the pressure in the intermediate space. Even with tight fitting liners wherein the constructively defined intermediate space is negligibly small, gaseous or liquid components of the fluid in the interior of the liner may permeate over time through the liner wall. Consequently, this can cause some detachment of the liner from the pipe thereby creating an intermediate space of a particular size.

During normal operation, when the lined pipe is filled with fluids under pressure, this leakage is not much of a concern since the pressure of the fluid in the interior of the liner (the internal pressure) equals or exceeds the pressure of the fluid in the intermediate space. However, during the operation of a lined pipe it can happen that the internal pressure drops, for example if the pipe is emptied or evacuated. Then, suddenly the pressure in the intermediate space can exceed the internal pressure sufficiently in order to cause further detachment of the liner from the pipe, deformation of the liner or even a complete collapse, rupture or other damage of the liner. This constitutes a serious practical problem for the application of lined pipes.

A known solution to this problem is to provide the pipe with a so-called annulus vent opening, through which fluid can escape from the intermediate space through the pipe wall. The annulus vent opening can directly open into the atmosphere, or when the pipeline is buried, an exhaust conduit can be connected to the vent opening which extends to the surface. The outflux of fluid can be regulated by an operator manipulatable valve, which can be arranged at the vent opening or along the exhaust conduit. Then, in order to prevent accumulation of fluids in the space between the liner and the pipe, this space has to be regularly vented, and to this end an operator has to attend each valve to allow venting of fluids from the annulus. Apart from being labour intensive, this presents potential safety risks, and if the valves are not opened quickly enough in case of a pressure drop in the pipe, the liner can still become damaged.

In order to avoid venting to the atmosphere in the known solutions, the fluid can be conducted to a fluid disposal system. However, for an extended pipeline such a fluid disposal system becomes rather complex and requires additional infrastructure to be installed.

SUMMARY OF THE INVENTION

It is therefore an object of the present invention to provide a lined pipe, wherein venting of the intermediate space is provided for in an easy way.

It is a further object of the present invention to provide a lined pipe, wherein the intermediate space is not vented to the environment and wherein no external fluid disposal system is required.

The present invention is based on the insight, that an efficient venting of the intermediate space is achieved by arranging a non-return valve in a passage through the liner wall, such that fluid can only pass from the intermediate space to the interior of the liner through the non-return valve.

Accordingly there is provided a pipe for the transport of fluids, which pipe is internally provided with a liner, wherein the liner is provided with at least one non-return valve arranged in the liner wall, wherein the non-return valve has an inlet end arranged near the outer surface of the liner wall and an outlet end arranged near the inner surface of the liner wall.

The invention also relates to a liner for fitting into such a pipe, which liner is provided with at least one non-return valve.

International patent application with publication number WO 00/17479 herein incorporated by reference and discloses a reinforced flexible tubular pipe comprising an outer jacket and an inner liner separated by a lumen, in which one or more reinforcing layers are arranged. In the known pipe, the accumulation of fluid in the lumen is prevented by providing a flow path for conveying fluid from an inlet in the lumen, out through the outer coating where the flow path is provided with a one-way valve, and back into the pipe where the flow path debouches in an outlet in the interior of the liner.

International patent application with publication number WO 00/08368 herein incorporated by reference and discloses a pipe provided with a liner, wherein the pipe wall is provided with a non-return valve for venting of fluid accumulated in the intermediate space between liner and pipe to the outside of the pipe.

BRIEF DESCRIPTION OF THE DRAWINGS

The present invention will now be described by way of example and with reference to the accompanying drawings, wherein.

DETAILED DESCRIPTION OF THE PREFERRED EMBODIMENT

Figure 1:
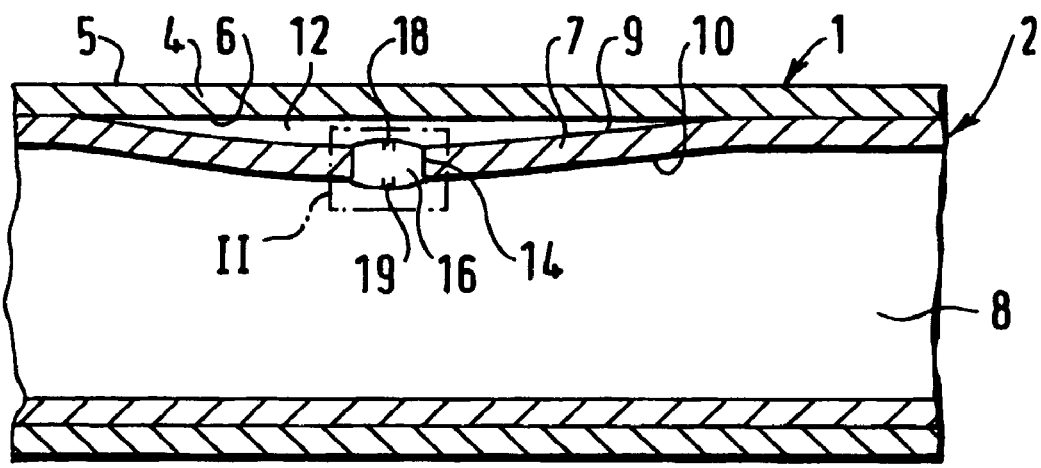
FIG. 1 shows schematically a longitudinal section through a pipe provided with an internal liner according to the invention.

Reference is made to FIG. 1. The pipe 1 in this example has cylindrical shape, and is internally provided with a liner 2. The pipe 1 has a pipe wall 4 having an outer surface 5 and an inner surface 6. The liner 2 is a hollow tube having a liner wall 7 and an interior 8. The liner wall 7 has an outer surface 9 and an inner surface 10. All surfaces 5, 6, 9 and 10 are smooth surfaces. The liner of this example is a tight fitting liner, such that after the initial fitting of the liner 2 into the pipe 1 the outer surface 9 of the liner wall 7 presses against the inner surface 6 of the pipe wall 4. As shown in FIG. 1, in a certain region of the lined pipe 1 an intermediate space 12 can be present or can be formed during operation between the outer surface 9 and the inner surface 6.

According to the invention, the liner is provided with at least one non-return valve arranged in the liner wall, wherein the non-return valve has an inlet end arranged near the outer surface of the liner wall and an outlet end arranged near the inner surface of the liner wall, and wherein the non-return valve is arranged such that during normal operation fluid flow from the outlet end to the inlet end is prevented.

To this end, in this example a passage 14 is arranged in the liner wall 7, in the form of a bore extending from the outer surface 9 to the inner surface 10. A non-return valve 16 is fitted into the passage sealingly, i.e. such that fluid cannot pass through the passage while bypassing the non-return valve 16. The non-return valve has an inlet end 18 arranged near the outer surface 9 and an outlet end 19 arranged near the inner surface 10 of the liner wall 7. Details of the non-return valve 16 will be discussed with reference to FIG. 2. The non-return valve 16 is arranged such that if the pressure at the inlet end 18 exceeds the pressure at the outlet end 19 by more than a critical differential pressure, the non-return valve opens, such that the inlet and outlet ends are in fluid communication. If the pressure at the inlet end does not exceed the pressure at the outlet end by the certain value, the non-return valve is closed, such that there is no fluid communication between inlet and outlet ends. The critical differential pressure is determined by the valve closing force which is a characteristic of the non-return valve. In the practice of an application the critical differential pressure will normally be predetermined on the basis of e.g. constructive, operational, or safety parameters, and the valve closing force will be selected accordingly.

During normal operation, fluid is flowing at elevated pressure through the interior 8 of the liner 2, and therefore at the same time through the lined pipe 1. The fluid, or certain components thereof, can migrate through the liner wall 7 and accumulate in the intermediate space 12. Migration can for example take place by molecular diffusion through the liner wall, or by leakage. As a result, the pressure in the intermediate space will increase.

If the pressure in the interior 8 of the lined pipe drops such that the pressure of the fluid accumulated in the intermediate space 12 exceeds the pressure in the interior 8 by more than the critical differential pressure, the non-return valve 16 opens such the intermediate space 12 is in fluid communication with the interior 8 via the inlet end 18 and the outlet end 19. Due to the larger pressure in the intermediate space 12 fluid flows out of the intermediate space, and the pressure in the intermediate space decreases. If the pressure in the intermediate space has sufficiently decreased, the non-return valve will close.

Figure 2:
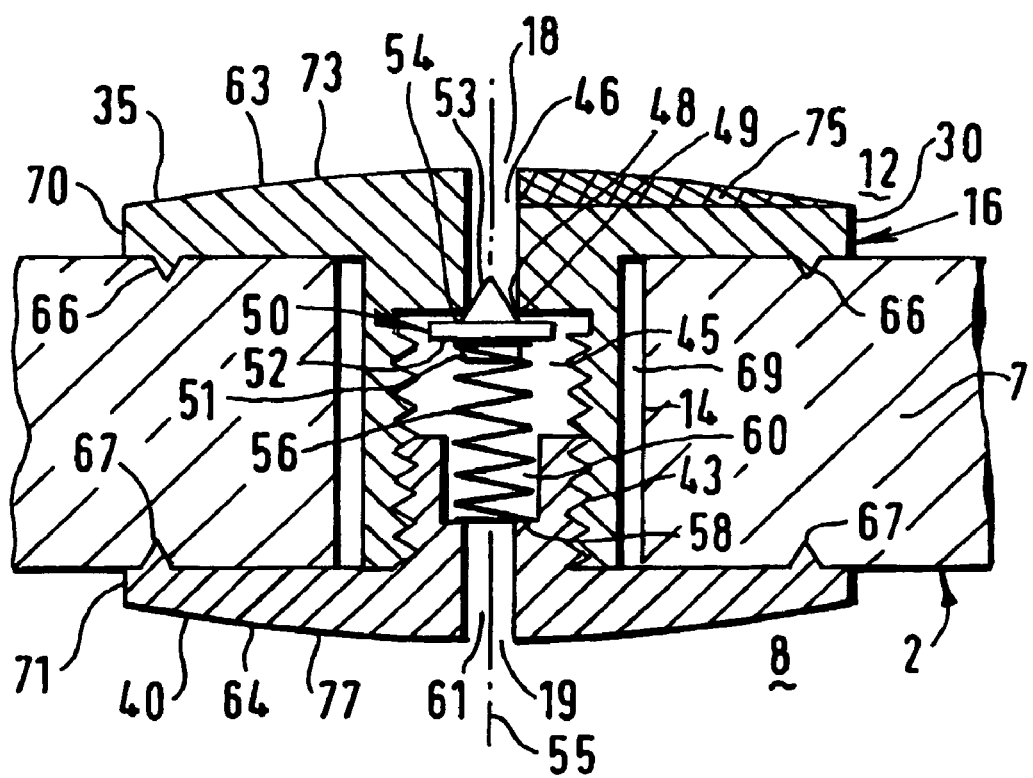
FIG. 2 shows schematically detail II of FIG. 1 on a larger scale.

Reference is now made to FIG. 2, which shows schematically detail II of FIG. 1 on a larger scale, wherein the non-return valve 16 which is sealingly mounted in a passage 14 through the wall 7 of a liner 2. The non-return valve 16 comprises a substantially circular symmetric housing 30 having an inlet end 18 and an outlet end 19. The housing is formed by two separate members, an inlet member 35 and an outlet member 40, which members are connected to each other in axial direction by means of thread 43. The two members embrace a valve chamber 45. The valve chamber 45 is connected to the inlet end 18 by an axial bore 46 through the inlet member 35, wherein the opening 48 of the bore 46 into the valve chamber 45 forms the inlet to the valve chamber. The part of the inlet member 35 that surrounds the opening 48 is referred to as the valve seat 49. In the valve chamber 45 a valve body 50 is arranged, wherein the valve body 50 has cylindrical symmetry and is aligned with the axis 55 of the housing 30. The valve body 50 comprises a base 51, a flange 52 and a conical tip 53 facing towards the valve seat 49, wherein the diameter of the base 54 of the conical tip 53 is larger than the diameter of the bore 46. To the base 51 of the valve body 50 one end of a helical spring 56 is attached, which spring is also aligned with the axis 55. The other end of the helical spring rests on a shoulder 58 of the outlet member 40. The shoulder 58 is formed at the transition from an inner axial bore 60 to an outer axial bore 61, which bores connect the valve chamber 45 to the outlet end 19, wherein the inner bore 60 has a larger diameter than the outer bore 61. The spring 56 has, when fully expanded, a length greater than the distance between the valve seat 49 and the shoulder 58. Therefore, when assembled in the valve 30, the spring is compressed in axial direction, and it therefore acts as a means for forcing the valve body 50 against the valve seat 49 with a closing force. The closing force is determined by the spring constant and the compressed and fully expanded lengths of the spring 56.

In order to arrange that fluid can only pass from the intermediate space 12 to the interior 8 of the liner 7 through the non-return valve 16, the non-return valve 16 is sealingly fitted in the passage 14 through the liner wall 7. To this end, the head pieces 63 of the inlet member 35 and the head piece 64 of the outlet member 40 are provided with circular bevelled edges 66 and 67, respectively, which bevelled edges can carve tightly into the liner wall 7. Further, the diameter of the passage 14 can be selected such that the housing 30 of the non-return valve fits tightly into the passage 14. The size of the gap 69 between the housing 30 and the passage 14 has been exaggerated in the drawing for the sake of clarity. For mounting of the non-return valve 16 in the passage 14, the circumferences 70 and 71 of head pieces 63 and 64 have hexagonal shape when viewed from the top or bottom, such that they can be turned with a spanner. Further, the thickness of the head piece 63 of the inlet member 35 in axial direction is kept to a minimum, in order to allow tight fitting of the liner 2 to the pipe 1. The outer face 73 of the head piece 63 is curved slightly convex, and a number of channels 75 are arranged in the head piece 63. The channels 75 allow fluid communication between the intermediate space 12 and the inlet end 18 of the non-return valve 16, even if the outer face 73 presses firmly against the inner surface 6 of the wall 4 of the pipe 1.

The thickness in axial direction of the head piece 64 of the outlet member 40 is also kept to a minimum, and the outer face 77 is curved slightly convex. In this way the flow of fluid through the interior 8 of the liner is not substantially disturbed. Also the inspection of the lined pipe, using for example a so-called pigging tool, is not hampered.

During normal operation of the non-return valve 16, the helical spring 56 presses the valve body 50 against the valve seat 49 with the closing force, such that the conical tip 53 closes the opening 48 which is the inlet to the valve chamber 45. The situation can occur that the pressure in the intermediate space 12 exceeds the pressure in the interior of the liner 8 by more than the critical differential pressure. Then, the axial force that acts on the valve body 50 in the direction from the inlet end 18 to the outlet end 19 of the non-return valve exceeds the total of axial forces that act on the valve body 50 in the direction from the outlet end 19 to the inlet end 18. Therefore, the valve body lifts off the valve seat, which brings the inlet end 18 into fluid communication with the outlet end 19.

The non-return valve can be made of any suitable material or combination of materials, for example a corrosion resistant alloy, or the liner material itself. The selection of the liner material, like other valve design parameters, can also depend on the technique used for liner installation.

In another embodiment (not shown) the non-return valve can be a flapper valve. In particular, the valve body of the flapper valve can be integral with the liner, and the flapper can for example be arranged to fit into a recess at the side of the inner wall of the liner. Further, the flapper can essentially be made of the liner material.

Although the present invention has in the examples been described with reference to a tight fitting liner it will be clear that it can also be applied in the case of a loose fitting liner.

It will be understood that in the practice of the application of the present invention the liner can be provided with a plurality of non-return valves which are sealingly fitted into a plurality of passages through the liner along and/or around the circumference of the pipe. Suitably, valves can be placed in the vicinity of any flanges of the liner and/or the pipe. It can also be advantageous to arrange pairs of valves, spaced by ca. 180 degrees around the circumference of the pipe. The circumferential position of a valve will often not have an influence on its operation, but if necessary the formation of liquid in the bottom part of the pipe can be taken into account to select the circumferential position.

We claim:

1. A pipe for the transport of fluids comprising:
   a liner having an inner and an outer side, arranged inside the pipe;
   an intermediate space located between the pipe and the liner;
   at least one non-return valve arranged in the liner, which allows fluid to pass from the intermediate space into the pipe when a pressure at the outer side of the liner exceeds a pressure at the inner side of the liner by a critical differential pressure.

2. The pipe according to claim 1, wherein the non-return valve comprises:
   a housing having an inlet end, a valve seat, a valve chamber, and an outlet end;
   a valve body arranged in the valve chamber; and
   a means for forcing the valve body against the valve seating with a closing force.

3. The pipe according to claim 2, wherein the means for forcing the valve body against the valve seat comprises a spring.

4. The pipe according to claim 3, wherein the non-return valve is a flapper valve.

5. The pipe according to claim 2, wherein the housing is arranged to sealingly fit into a passage through the liner wall.

6. The pipe according to claim 2, wherein the valve seat has an opening that is in fluid communication with the inlet end.

7. The pipe according to claim 2, wherein the opening of the valve seat forms the inlet of the valve chamber.

8. The pipe according to claim 2, wherein the valve chamber is in fluid communication with the outlet end.

9. The pipe according to claim 2, wherein the valve body is arranged to allow fluid communication through the opening in the valve seat only if the pressure at the inlet exceeds the pressure at the outlet end by at least the critical differential pressure, which is determined by the closing force.

10. A pipe for the transport of fluids comprising:
    a liner, having an inner and an outer side, arranged inside the pipe;
    an intermediate space located between the pipe and the liner;
    at least one non-return valve arranged in the liner comprising
       a housing having an inlet end, a valve seat, a valve chamber, and an outlet end;
       a valve body arranged in the valve chamber; and
       a means for forcing the valve body against the valve seating with a closing force,
    wherein the housing is arranged to sealingly fit into a passage through the liner wall,
    wherein the valve seat has an opening that is in fluid communication with the inlet end,
    wherein the opening of the valve seat forms the inlet of the valve chamber,
    wherein the valve chamber is in fluid communication with the outlet end,
    wherein the valve body is arranged to allow fluid communication through the opening in the valve seat only if the pressure at the inlet exceeds the pressure at the outlet end by at least a value, which is determined by the closing force, and
    wherein the means for forcing the valve body against the valve seat comprises a spring.

11. A method for venting fluid in a pipe for the transport of fluid comprising:
    providing a liner with at least one non-return valve integrated therein;
    placing the liner inside the pipe so that an intermediate space is formed between the pipe and the liner;
    venting fluid from the intermediate space into the pipe through the non-return valve when the pressure inside the intermediate space reaches a specified value.

* * * * *